United States Patent [19]

Schmidt

[11] Patent Number: 4,487,217
[45] Date of Patent: Dec. 11, 1984

[54] REVERSING VALVE FOR COMBINATION METER

[75] Inventor: Karl Schmidt, Ansbach, Fed. Rep. of Germany

[73] Assignee: Hydrometer GmbH, Ansbach, Fed. Rep. of Germany

[21] Appl. No.: 389,412

[22] Filed: Jun. 17, 1982

[30] Foreign Application Priority Data

Jun. 22, 1981 [DE] Fed. Rep. of Germany ....... 3124371

[51] Int. Cl.$^3$ ............................................. F16K 31/12
[52] U.S. Cl. .................................... 137/110; 137/219; 137/469; 137/494
[58] Field of Search ............... 137/111, 469, 472, 475, 137/220, 219, 109, 114; 73/197

[56] References Cited

U.S. PATENT DOCUMENTS

| | | |
|---|---|---|
| 3,465,778 | 9/1969 | Kast .................................... 137/469 |
| 4,429,571 | 2/1984 | Kullmann et al. ..................... 73/197 |

FOREIGN PATENT DOCUMENTS

| | | | |
|---|---|---|---|
| 865814 | 2/1953 | Fed. Rep. of Germany ...... 137/114 |
| 91145 | 6/1959 | Netherlands ........................ 137/220 |

*Primary Examiner*—Martin P. Schwadron
*Assistant Examiner*—James R. Shay
*Attorney, Agent, or Firm*—Becker & Becker, Inc.

[57] ABSTRACT

A reversing valve for a combination meter, including a closure element, movable in the axial direction, which is provided with a cylindrical closure ring which in the closed position of the reversing valve covers radially outwardly directed valve openings, and having at least one channel extending essentially axially associated therewith, which channel is closed in the closed position though already after slight shifting of the closure element in the direction of its open position communicates the working chamber of a hydraulic adjustment member with the main flow. The working chamber additionally has a presettable opening which is always open in the direction of the auxiliary flow or total flow. The effective-pressure-cross section of the closure element is suddenly enlarged inwardly during opening, and is reduced in a sudden manner during closing, by having the main flow act on the working chamber. This hydraulically effected change of the force which is effective counter to the spring makes possible the quick opening and closing of the reversing valve in one stroke.

20 Claims, 13 Drawing Figures

REVERSING VALVE FOR COMBINATION METER

A closure element movable in axial direction within a valve housing generally is the subject of improvement in operation thereof involving flow and spring action therewith.

BACKGROUND OF THE INVENTION

Hydraulically effected change of force which is effective counter to a spring makes possible quick opening and closing of the reversing valve in one stroke.

1. Field of the Invention

The present invention relates to a switch valve, reversing valve, or change-over valve, for a combination meter having a main meter acted upon by a main flow, and an auxiliary meter acted upon by an auxiliary flow; a closure element is movable in the axial direction within the reversing valve housing, and is adjustable directly and from time to time by a hydraulic adjustment 7 member by the flow pressure of the measured liquid and by the pressure of the force of a spring element which is effective counter to the flow pressure of the measuring liquid; the main flow is greatly throttled in the last closing phase of the closure element.

2. Description of the Prior Art

A reversing valve of this general type is disclosed by German Patent No. 1960735 Schmidt and British Patent No. 1,331,973 corresponding thereto, each belonging to the assignee of the present invention. The closure element of the known reversing valve is movable directly by the pressure of the main flow and two spring elements of different strength effective counter thereto. The strong spring element is effective only in the direct closing range. If the closure element has left this direct closing range, the strong spring force is mechanically eliminated as a result of the constructive configuration of the reversing valve, and only the weak spring element now acts counter to the flow pressure with a relatively flat characteristic curve. A hydraulic adjustment member in the form of a hydraulic pusher is additionally associated with the closure element; the working chamber of the pusher is continually only acted upon by the pressure of the main flow, so that the hydraulic pusher, and hence during closing also the closure element, are continuously subjected to the differential pressure of the measured liquid ahead of and behind the closure element and the spring elements effective counter thereto. During opening of the closure element, the hydraulic pusher is lifted therefrom, moves after the opening as a result of decrease of the pressure difference in the direction of the closure element, and takes the latter along counter to, and dependent upon, the flow pressure of the measured liquid, until after it has covered a predetermined distance, the strong spring element becomes effective and suddenly presses the closure element into the closed position. With the known reversing valve, the inlet for the auxiliary flow is located in the region of the inlet for the main flow. Downstream from the inlet of the auxiliary flow, the closure element has an annular plate or disc on its outer periphery; this plate or disc coöperates with a throttle ring on the inner side of the housing of the reversing valve in the manner of a throttle element. The spacing between the plate or disc and the throttle ring forms an annular throttle opening. If only the auxiliary meter is operating, the plate or disc is located upstream ahead of the throttle ring; when both main and auxiliary meters are operating, the plate or disc is located downstream after the throttle ring. When the closure element is moved in the direction of the closed position, the force of the weak spring element on the one hand, and a force effective counter thereto on the other hand, are effective, which corresponds to the pressure loss resulting from the throttling between the plate or disc and the throttle element, with respect to the entire cross section of the closure element as enlarged by the plate or disc. The spacing or distance between the plate or disc and the throttle ring is such that a further movement of the closure element in the closed direction occurs only when the entire flow of the main and auxiliary meters is decreased below the valve which was necessary for opening. If this is the case, the plate or disc approaches the throttle ring, the strong spring element is effective in addition to the weak spring element and thereby increases the closing force in a sudden manner, the disc or plate passes the throttle ring, the free through-passage cross section is suddenly expanded, and the force effective counter to the spring elements thereby decreases abruptly and makes possible an accelerated closing of the reversing valve. The opening of the reversing valve is likewise effected in a sudden manner, since a throttling immediately occurs between the plate or disc and the throttle ring with a movement of the closure element, so that the closure element passes the throttle ring with its plate or disc positively by means of the resulting increase of the pressure difference. The pressure relief in the open position is attained by eliminating the force of the strong spring element, and by increasing the effective pressure surface of the closure element by the surface of the annular plate or disc. The known reversing switch operates completely satisfactorily with respect to the reversing points of the main meter during rising and dropping load, and the permissible measuring error range is not fully utilized during the reversing.

When using only one spring, it must be strong enough that the closure element remains in the closed position until the auxiliary meter produces a through-flow intensity which is greater than the lower measuring region limit of the main meter in order to also maintain the limits or error during the reversal. However, the force of the strong spring is still further increased during opening, which additionally counters an effective pressure relief. If this is to occur via an enlargement of the cross section of the closure element by means of the plate or disc of the throttle element, then the pressure relief after the opening is slight with a plate or disc which is kept small, and the necessity of a very small gap for opening and closing between the plate or disc and the throttle ring is disadvantageous. Although an enlargement of the plate or disc produces a better pressure relief after the opening, a larger and heavier housing is required, and the cross section of the annular gap cannot be arbitrarily enlarged because of the necessity for maintaining the reversing points, since the annular gap is correspondingly longer in the peripheral direction as a consequence of the greater circumference of the plate or disc. This in turn requires a narrower annular gap, which promotes the entry and deposition of foreign bodies, which prevent the free movement of the closure element and also block the latter. Already with unavoidable, smaller deposits on the large (relative to the cross section) surface of such annular gaps, clear cross sectional reductions result, which in turn result in a disadvantageous shifting of the reversing points.

SUMMARY OF THE INVENTION

In contrast, it is an object of the present invention, despite utilizing only a single, and in fact a weak, spring element, to achieve a strong holding force prior to opening of the closure element, an effective pressure relief in the opening position, and a force rising again in a sudden manner in the last closing phase.

This object, and other objects and advantages of the present invention, will appear more clearly from the following specification in connection with the accompanying drawings.

DETAILED DESCRIPTION

The reversing valve of the present invention is characterized primarily in that a bearing plate or disc is arranged within the housing at a distance from an inlet opening of the main flow while leaving free valve openings which are directed radially outwardly for the main flow; a closure ring arranged on the closure element for covering the valve openings is guided on the bearing plate or disc in such a was as to be movable axially back and forth; the closure ring has associated therewith at least one essentially axially extending channel, the inlet opening of which is always open in the direction of the main flow, and the outlet opening of which is closed in the closed position of the closure element, though already after slight shifting of the closure element in the direction of its open position is in communication with a working chamber of the hydraulic adjustment member associated with the closure element; the working chamber is subjected to the pressure of the auxiliary flow at least as long as the channel is closed; the closure element is adjustable by the variations of volume of the working chamber, which variations are a function of the pressure difference between the main flow and the auxiliary flow or the total flow.

With the inventive reversing valve, an improved pressure relief is attained after opening the closure element. The dynamic mean flow pressure of the flow moving in the main conduit is intercepted during closing by the closure ring, which is radially acted upon thereby. A single relatively weak spring is sufficient, since the pressure of the main flow is no longer effective upon the entire cross section of the closure element briefly before the opening and briefly before the closing, but rather is then only effective upon a narrow circular ring on the closure ring. The circular ring on the closure element, acted upon by the main flow in the closed position of the closure element, results thereby that the generally numerous, essentially axially extending channels, are always open in the direction of the main flow. The working chamber of the adjustment member, in the closed position of the closure element, is subjected to the pressure of the auxiliary or total flow, so that only after a greater pressure increase of the main flow on the circular ring is the closure element adjusted. Already after slight shifting of the closure element in the direction of its open position, the outlet openings of the channels are released, and the working chamber of the adjustment member is acted upon by the pressure of the main flow, whereby the effective surface of the main flow-pressure is considerably increased inwardly, so that the closure element suddenly occupies the open position, even when the opening remains open on the total-flow side. This effect is increased thereby that the closure or sealing on the end face of the closure ring is maintained at least until the outlet openings of the channels are released. The seat of the sealing element is held against the closure ring in that the pressure of the main flow passes between the sealing element and the support ring, so that the sealing element, with its movable seat, follows the beginning shifting of the closure element in the direction of the open position. The pressure relief for suddenly attaining the closed position of the closure element is effected by closing the outlet openings of the axial channels. As a result, the effective cross section of the closure element acted on by the pressure of the main flow is suddenly reduced on the circular ring. This cross section is independent of how the channels are constructed and arranged, and whether on the end face of the closure ring there is provided an internally located chamfer or bevel, which is very small relative to the effective pressure surface of the adjustment member. The channel or channels which extend essentially axially can be formed directly on the inner side of the closure ring or on the outwardly directed surface of the bearing disc. In the latter situation, the outlet openings of the channels are closable in the closed position of the closure element by an axial valve having an elastic, radial sealing surface at the outer periphery of the working chamber.

The auxiliary flow can be supplied at any location downstream from the closure element. The reversing valve operates with a single, relatively weak spring which has a flat spring characteristic curve and, insofar as a throttle element is provided, the annular gap can be relatively large. This has the advantage that with respect to the mounting and guidance of the closure element, greater production tolerances exist. Additionally, there is no danger that deposits can form in the throttle gap.

According to specific features of the present invention, the closure element, with the closure ring guided upon the bearing disc, and an essentially radial rear wall, which surround the working chamber, may be essentially bell-shaped.

The rear wall of the closure element may have a presettable opening which is always open in the direction of the auxiliary or total flow.

The rear wall of the closure element may have a closable passage which is open at most as long as the channel which establishes the connection with the main flow is closed.

The channel or channels may have a greater flow cross section than does the presettable opening. Several grooves extending essentially axially may be formed as channels in the inwardly directed surface of the closure ring. The grooves may have a dovetail shape, with relatively narrow slits being provided in the inwardly directed surface of the closure ring.

The closure ring may, as channels, have several essentially axially extending bores, each of which has an inlet opening and an outlet opening.

A bevel or chamfer which slants inwardly away from the main flow may be provided on the inwardly directed edge of the closure ring, which edge is provided with the inlet openings of the channels.

The inlet openings for the main flow may be provided in a support ring, of a support body, fastened on the housing; this support ring may have inwardly projecting ribs on which the bearing disc is arranged displaced or offset in the axial direction and downstream relative to the support ring.

An annular, elastic sealing element may be held between the support ring and a housing ring; this sealing element has an annular elastically yieldable seat for an end face of the closure ring of the closure element; that side of the sealing element facing away from the seat is acted upon by the pressure of the main flow, so that during opening of the reversing valve, the end face is in engagement with the annular seat longer than the latter comes into engagement with the end face during closing of the reversing valve.

A sealing ring having a slip ring may be provided on the periphery of the bearing disc for covering the outlet openings of the channels in the closed position of the closure element; however, after a slight shifting of the closure element, the main flow is allowed to enter the working chamber of the hydraulic adjustment member.

Several essentially axially extending grooves embodied as channels may be formed in the outwardly directed surface of the bearing disc or plate; the outlet openings of the grooves are closed in the closed position of the closure element by an axial valve having an elastic, radial sealing surface on the outer periphery of the working chamber of the hydraulic adjustment member.

The support body may have a central cylinder in which a piston is guided in such a way as to be movable axially back and forth; the rear wall of the closure element is connected with the piston, and a compression spring is arranged between a piston plate of the piston, and a downstream-arranged bottom of the cylinder; the spring applies the force which acts counter to the flow pressure of the measuring liquid. The compression spring may be a helical spring surrounding the piston.

The piston may have a collar or shoulder which in the maximum open position of the closure element engages against the downstream-arranged bottom of the cylinder.

A plate-like extension, which is adjustable with respect to a throttle ring fastened to the housing, may be provided on the outer periphery, and in the region of the end face, of the closure ring of the closure element. The throttle ring may have a cylindrical inner surface.

The throttle ring may be formed on a plug-in unit or portion which is insertable axially into the housing; this unit may be integral with a housing ring which is associated with the support ring of the support body.

The channel or channels may have a smaller flow cross section than does the closable passage.

DESCRIPTION OF PREFERRED EMBODIMENTS

Referring now to the drawings in detail, the reversing valve has a housing 10 to which is connected a non-illustrated main conduit which supplies a main flow 11 from a main meter. An auxiliary flow 12 is supplied from an auxiliary meter via a non-illustrated auxiliary conduit, which can, as indicated by way of example in FIGS. 1a and 9a, be introduced into the housing 10. The connection of the auxiliary conduit can vary, and can also be arranged after the housing, being associated with the total flow of the measured liquid, which is designated by the reference numeral 13. The auxiliary conduit branches off before the main meter, also has a spring loaded check valve, and constantly conveys measured liquid.

In the region of the connection flange for the non-illustrated main conduit, the housing 10 has a recess or bore 14 for a support or mounting body 15 which can be inserted coaxially into the housing 10. The support body 15 supports the closure element 35 (which will subsequently be described in detail), and thus forms a unit which is ready for installation, which can be exchanged at any time, and which can be installed particularly in existing reversing valve housings approximately of the type of construction of that of German Patent No. 19 60 735. For this purpose, the support body 15 has a support ring 16 which can be fastened in the recess or bore 14, and which is provided with radially inwardly extending ribs 7. The inlet opening 18 for the main flow 11 is provided between the ribs 17. A cylinder 19 is arranged in the center of the support body 15 at the inwardly located ends of the ribs 17. The cylinder 19 is surrounded by a bearing plate or disc 20 at the downstream ends of the ribs 17; the bearing disc 20, with the embodiment according to FIGS. 1a and 1b, comprises two parts 201 and 202 which are connected with each other. These parts 201 and 202 are injection molded parts of synthetic material which are fastened and thus held together at 30. Radially outwardly directed valve openings 21 for the main flow 11 are located between the support ring 16 and the bearing disc 20 or the ribs 17 as shown in FIG. 1a.

The bearing plate or disc 20, on its periphery, or on its parts 201 and 202, has a cylindrical bearing surface 22 (FIG. 1b) in which is formed an annular groove 23 for an oval, elastomeric sealing ring 24 which is straddled or overlapped by a slip ring 25 (see also FIG. 2) which has an essentially U-shaped profile, is open inwardly, and has radially outer surfaces on its legs. These legs guide the slip ring 25, which has a cylindrical peripheral surface, in a radially outwardly preloaded manner within the annular groove 23. The cylindrical peripheral surface of the slip ring 25 engages the inwardly directed cylindrical surface 42 of a closure ring 41 of the closure element 35.

Figure 1A:
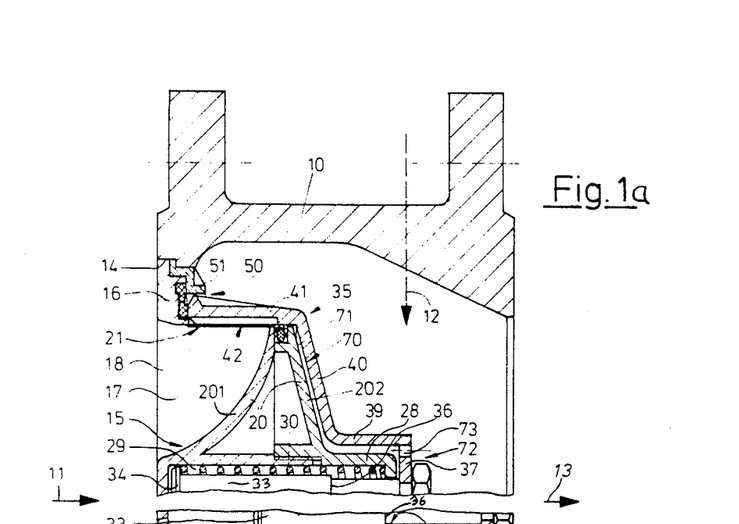
FIGS. 1a and 1b are longitudinal sections of one embodiment of the inventive reversing valve, whereby in the upper view of FIG. 1a, the valve is closed, and in the lower view of FIG. 1b the valve is open.
Figure 1B:
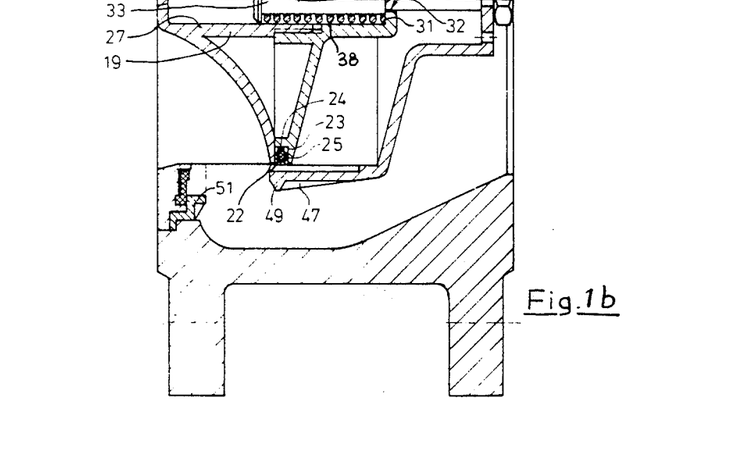

The bearing disc part 201 has a cylindrical portion 27 (FIG. 1b) which is closed off in the direction of the main flow 11, and the bearing disc part 202 is provided with a central cylindrical part 28 (FIG. 1a). These parts 27, 28 are held together by the fastening means 30, and form a cylindrical chamber 29. The downstream end of the cylinder 19, i.e. that end facing in the direction of the total flow 13, or the cylindrical part 28, is closed by a bottom 31 having a concentric bearing bore 32. A piston 33 of the closure element 35 of the reversing valve is guided in the bearing bore 32 in such a way as to be movable axially back and forth. The piston 33, in the region of the cylindrical portion 27 has a piston plate 34, and in the region of the cylindrical part 28, has a shoulder 36 which engages against the bottom 31 in the maximum open position of the closure element 35. In this way, the shoulder 36 operates as a stroke limiter. A helical compression spring 38 is arranged between the piston plate 34 and the bottom 31; the compression spring 38 surrounds the piston 33, and is relatively weak.

The closure element 35 is a bell-like body of rotation, and can be molded from synthetic material. The closure element 35 has a central rear wall segment 37 which is screwed to the piston 33, and has a somewhat larger diameter than the cylindrical part 28. The cylindrical part 28 is overlapped by a cylindrical segment 39 of the rear wall 40 of the closure element 35. The segment 39 connects the rear wall segment 37 with the actual rear wall 40. The cylindrical closure ring 41, which overlaps the bearing disc 20, is connected to the outer peripheral edge of the rear wall 40. The closure ring 41 has an inwardly directed cylindrical surface 42 which engages the bearing surface 22 or the slip ring 25.

Figures 2, 3, 4:
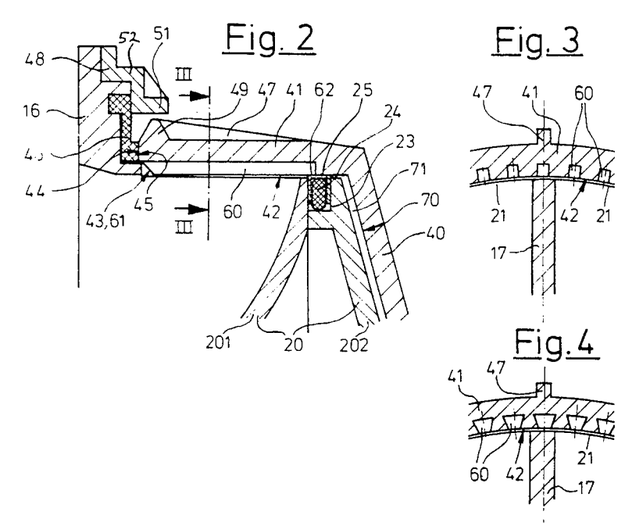
FIG. 2 shows a detail of the closure ring and of the sealing element.
FIG. 3 is a cross sectional view taken along line III—III in FIG. 2.
FIG. 4 is a modification of the view shown in FIG. 3.
Figure 5:
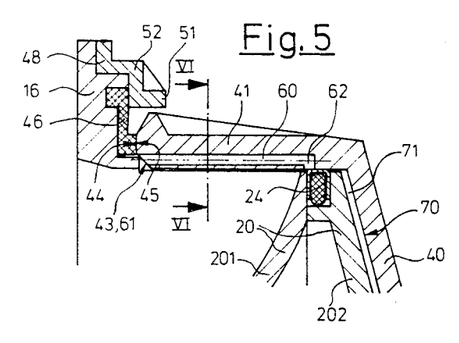
FIG. 5 is a detail of another closure ring and the sealing element.

As shown in FIGS. 2 and 5, a bevel or chamfer 43 is expediently formed at the end face 44 of the closure ring 41; this chamfer or bevel 43 slants inwardly in the direction of the surface 42. The otherwise radially constructed end face 44 is axially adjustable with respect to an annular, elastically yieldable seat 45 formed on an elastic sealing element 46. The sealing element 46 is arranged on the support ring 16 (as apparent in FIGS. 2 and 5), and is constructed in such a way that when the reversing valve is being opened, the end face 44 of the closure ring 41 contacts the annular seat 45 of the elastic sealing element 46 longer than the annular seat 45 of the elastic sealing element contacts the end face 44 when the reversing valve is being closed. For this purpose of longer and shorter duration of contacts, the sealing element 46 at a radially inner location thereof, on that side thereof facing away from the seat 45, can be acted upon by the pressure of the main flow, which can be supplied directly or via a connecting channel whereby movement of the sealing element 46 due to such flow pressure results only during opening but not during closing since then the pressures effective upon the elastic sealing element 46 are balanced or equalized. With both embodiments, the sealing element 46 is held particularly at a radially outer location thereof between the support ring 16 and a housing ring 48 located in the recess 14 of the housing 10 as apparent in FIG. 1a.

The cylindrical closure ring 41, in the region of the end face 44 and on its outer periphery, has a plate-shaped extension 49 which is secured by reinforcing ribs 47 relative to the closure ring 41. The radially projecting plate-like extension 49, and a throttle ring 51 provided on the housing 10, form a throttle element 50, whereby the throttle ring 51 is formed on a plug-in unit or portion 52 which is constructed integrally with the housing ring 48. Such throttle as well as purpose and function thereof can be found described in greater clarifying detail, for example, on Page 2, lines 19-60 inclusive of previously mentioned British Patent No. 1,331,973.

With the embodiments illustrated in FIGS. 1 through 6, the closure ring 41 has several axially extending channels 60. In the region of the chamfer or bevel 43, these channels 60 have a continually open inlet opening 61, and at 62 have an outlet opening which is closed by the slip ring 25 in the closed position of the closure element 35. As clearly shown in FIGS. 3, 4 and 6, the axial channels 60 are distributed over the periphery of the closure ring 41 at identical angular distances. The channels 60 can extend exactly axially, or can extend helically. With the embodiment according to FIG. 3, the channels 60 are grooves which are open in the direction of the surface 42. The cross section of the grooves 60 is dovetailed according to FIG. 4, with relatively narrow slots being provided in the inwardly direct surface 42 of the closure ring 41.

Figure 6:
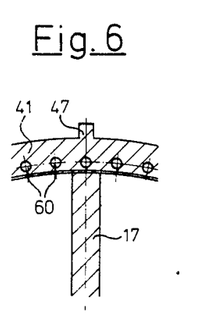
FIG. 6 is a section taken along line VI—VI in FIG. 5.

With the embodiment according to FIGS. 5 and 6, the channels 60 are constructed as axial bores which are closed in the region of the inwardly directed surface 42. The outlet opening 62 is formed by a radial bore.

The outlet openings 62 are arranged in such a way that already after a slight shifting of the closure element 35 in the direction of the open position, they are connected with a working chamber 71 of a hydraulic adjustment member 70 associated with the closure element 35. The working chamber 71 is essentially delimited by the stationary bearing disc part 202, the cylindrical part 28, and those parts of the closure element 35 which are movable in the manner of a piston, namely the rear wall 40, the cylindrical segment 39, and the central rear wall segment 37.

Figure 7:
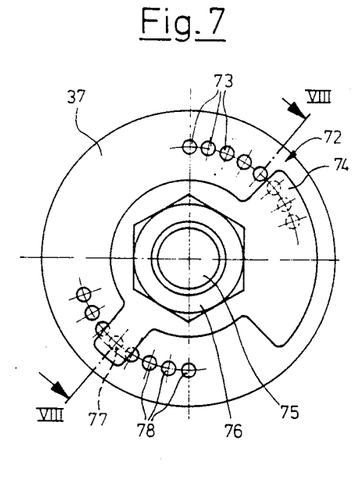
FIG. 7 is a detail view of the rear of the closure element.
Figure 8:
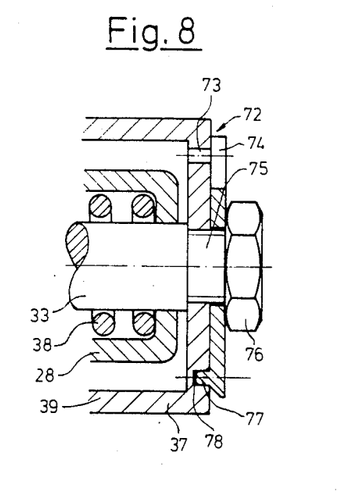
FIG. 8 is a section taken along line VIII—VIII in FIG. 7.

The central rear wall segment 37 has a presettable opening 72 for volume equalization. For this purpose, several through-bores 73 (FIGS. 7 and 8) are provided in the rear wall segment 37; these bores 73 can be covered by a plate-like element 74 which is pivotally mounted on a pin 75 on the piston 33, and can be fixed by a bolt 76. The plate-like element 74, on that side opposite the through-passage bores 73, has a pin 77 which is selectively insertable into the blind holes 78, as a result of which the opening 72 can be preset or preadjusted by the sum of the open through-passage bores 73. The presetting, which also serves for calibration purposes, is effected in such a way that the sum of the cross sectional surfaces of the channels 60 results in a greater flow cross section than that of the open through-passage bores 73.

Figures 9A, 9B, 10A, 10B:
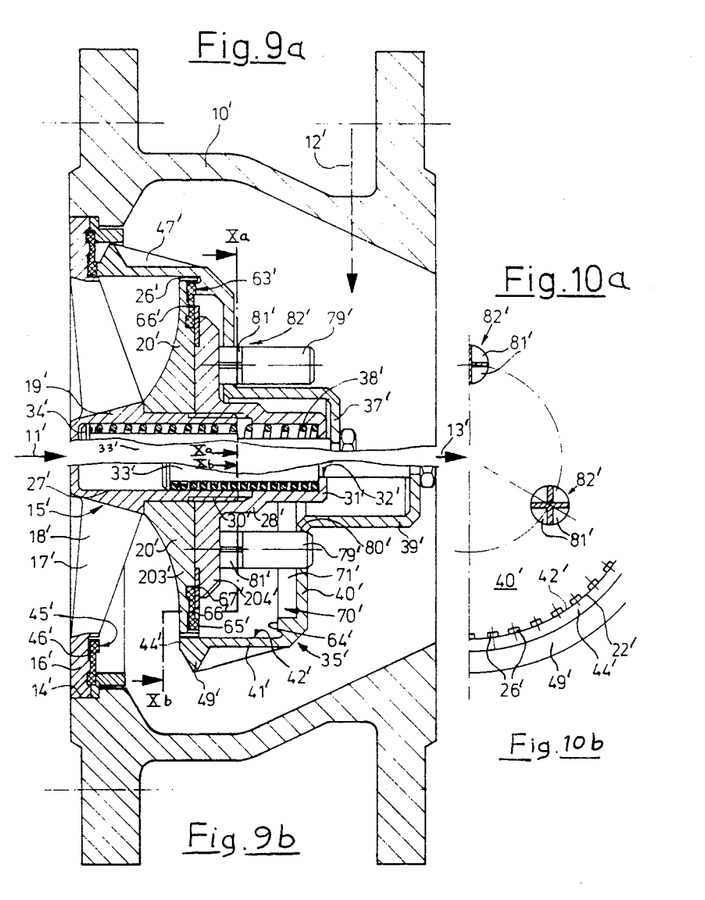
FIGS. 9a and 9b show a further embodiment of the reversing valve in a longitudinal section, whereby in the upper view of FIG. 9a, the valve is closed, and in the lower view of FIG. 9b, the valve is shown open.
FIGS. 10a and 10b are sections taken along line Xa—Xa in FIG. 9a, and line Xb—Xb in FIG. 9b respectively.

The bearing disc or plate 20' is constructed somewhat differently with the embodiment according to FIGS. 9 and 10. The cylindrical part 27' is surrounded by a separate bearing disc 203', against which rests a bearing disc 204' which is constructed integrally with the cylinder part 28'. The bearing discs 203' and 204' form the bearing plate, with several essentially axially extending grooves 26' being provided as channels in the outwardly directed surface 22' of the bearing disc 203. The grooves 26' are continuous, whereby the outwardly directed surface 22' of the bearing plate 20' engages the smooth inwardly directed surface 42' of the closure ring 41'. An axial valve 63' is arranged at the outlet side of the grooves 26'; the valve body of the axial valve 63' has a radial surface 64' on the rear wall 40' (FIG. 9b). In the closed position, the radial surface 64' cooperates with an elastic, radial sealing surface 65' which is formed on an elastic sealing element 66', which has a construction similar to that of the sealing element 46. The sealing element 66' is held between the two bearing discs 203' and 204' by means of an annular disc 67'. The upstream-directed rear side of the sealing element 66' is continuously subjected to the pressure of the main flow 11' via the grooves 26'.

Cylindrical pistons 79', which are guided in through-passage bores 80 of the rear wall 40', are arranged on that surface of the bearing disc 204' facing in the direction of the total flow 13'. The pistons 79' have openings 81' directly adjacent to the bearing disc 204'; these openings 81', together with the through-passage bores 80' and the pistons 79', form closable passages 82'. The closable passages 82' together have a greater flow cross section than the sum of the channels 26', and in the open condition, i.e. in the closed position of the reversing valve, communicate with the auxiliary flow 12', so that the working chamber 71' of the hydraulic adjustment member 70' is acted on by the pressure of the auxiliary flow.

In the closed position, the end face 44' seals with respect to the sealing element 46', and the radial sealing surface 64' seals with respect to the sealing element 66'. The pressure loss resulting from the auxiliary meter during an increase of the through-flow is effective on a circular cross section which lies between the inner edge of the surfaces 44'/45', and the outer edge of the surfaces 64'/65'. During an increase of the pressure of the main flow 11', the closure element 35' is shifted downstream, whereby the through-passage bores 80', with the cylindrical piston 79', substantially close the passages 82', so that the pressure of the main flow 11' rapidly builds up in the working chamber 71' after the axial valve 63' is opened, and the rear wall 40' moves away from the bearing plate 20'. The sealing contact of surfaces 44'/45' is initially still maintained. Shortly before the closing, when the plate-like extention 49' reaches the front edge of the throttle ring 51', the throttle element 50' becomes effective. The effect of the hydraulic adjustment member 70' is eliminated in that the through-passage bores 80' are shifted over the openings 81', thereby exposing them. Consequently, the measuring liquid of the main flow 11' following through the grooves 26' can escape freely from the working chamber 71', as a result of which the enlargement of the effective cross section in the form of the engagement of the rear wall 40' is eliminated directly after the opening. A relieving results thereby shortly before attaining the closed position, so that the closure element 35' is pressed into the closed position in a sudden manner. Here too a relatively weak spring 38' can be used, since this spring 38' only needs to withstand at a maximum an effective pressure of 0.2 bar on the annular surface between the inner edge of the surfaces 44'/45' and the outer edge of the surfaces 64'/65'. These values formed by the surfaces 44'/45' and 64'/65' are provided in such a way that during opening of the reversing valve, the axial valve 63' ahead of the valve surfaces 44'/45' releases the through-flow for the main flow 11'.

The through-flow intensity of the volume flow when the reversing valve is opened is determined by the pressure loss of the auxiliary meter conduit, including the auxiliary meter and the force of the spring 38' with respect to the main flow pressure relative to the size of the surface of the initially engaged circular ring.

The spring-loaded return-flow prevention installed in the auxiliary meter conduit is constructed in such a way that the effective pressure thereof in the direction of "closing" is equal to or greater than the pressure exerted on the closure element when the hydraulic adjustment member 70 is acted on by the pressure of the main flow 11. As a result, a following of the auxiliary meter, which is disadvantageous for stopping measuring errors in the reversing region, is prevented shortly after the opening and shortly before the closing.

When a throttle element 50 is provided, its throttle gap is such that the volume flow flowing during opening moves the closure element 35 so far downstream counter to the force of the spring 38 until the plate-like extension 49 comes to rest downstream of the throttle ring 51. The closing of the reversing valve can first occur when the plate-like extension 49 again enters this ring 51, i.e., when the entire through-flow has dropped so far that the pressure loss resulting in the throttle element 50, and the thereby resulting force directed downstream, are smaller than the spring force directed upstream and effective on the closure element.

A change or variation of the through-flow during closing is possible through additional opening or closing of the through-bore 73. By the additional opening of such a bore, measuring liquid can flow out shortly before the closing in addition to the volume flow flowing through the throttle element 50, with this measuring liquid also flowing out through the open channels 60 and via the working chamber of the adjustment member 70, increasing the entire through-flow before the closing, without increasing the pressure loss in the throttle element.

The present invention is, of course, in no way restricted to the specific disclosure of the specification and drawings, but also encompasses any modifications within the scope of the appended claims.

What I claim is :

1. A reversing valve for a combination meter, said valve being supplied by a main flow from a main meter, and an auxiliary flow from an auxiliary meter, said reversing valve comprising:
   a housing having an inlet opening for said main flow, and receiving said auxiliary flow downstream from said inlet opening for said main flow; said housing also having an outlet for total flow;
   a closure element which is movable in the axial direction within said housing;
   a hydraulic adjustment member having a working chamber and associated with said closure element;
   a bearing disc arranged in said housing at least partially downstream from said inlet opening for said main flow, with radially outwardly directed valve openings for said main flow being provided between said bearing disc and said housing;
   a closure ring arranged on said closure element and axially movable therewith, while being guided on said bearing disc, for covering said valve openings; said closure ring being provided with at least one essentially axially extending channel, each of which has an inlet opening which is alway open in the direction of said main flow, and on outlet opening which is closed in the closed position of said closure element, said outlet opening, however, already after a slight shifting of said closure element in the direction of its open position, being in communication with said working chamber of said adjustment member, with said working chamber being subjected to the pressure of said auxiliary flow at least as long as said at least one channel is closed; and
   a spring element associated with said closure element and being effective counter to said main flow, with said closure element being directly affected and adjustable by the pressure of said spring element, by the pressure of said main and auxiliary flows, and from time to time by the variations of volume of said working chamber, said variations of volume being a function of the pressure difference between said main flow and one of said auxiliary and total flows, said main flow being greatly throttled in the last closing phase of said closure element.

2. A reversing valve according to claim 1, in which said closure element is essentially bell-shaped, and includes an essentially radially extending rear wall, which, together with said closure ring which is guided on said bearing disc, enclose said working chamber downstream from said inlet opening for said main flow.

3. A reversing valve according to claim 2, in which said rear wall of said closure element is provided with a presettable opening which is always open in the direction of at least one of said auxiliary and total flows.

4. A reversing valve according to claim 2, in which said rear wall of said closure element is provided with a closable passage which is open at most as long as said at least one channel which establishes communication with said main flow is closed.

5. A reversing valve according to claim 3, in which said at least one channel has a larger flow cross section than does said presettable opening.

6. A reversing valve according to claim 3, in which said closure ring has a radially inwardly directed surface, and in which said channels are a plurality of essentially axially extending grooves formed in said inwardly directed surface of said closure ring.

7. A reversing valve according to claim 6, in which said grooves have a dovetail shape, and in which narrow slits are provided in said inwardly directed surface of said closure ring.

8. A reversing valve according to claim 3, in which said channels are a plurality of essentially axially extending bores in said closure ring, each bore being provided with said inlet and outlet opening.

9. A reversing valve according to claim 5, in which that inwardly directed edge of said closure ring which is provided with said inlet openings of said channels is provided with a bevel which slants inwardly away from said inlet opening for said main flow.

10. A reversing valve according to claim 2, which includes a support body arranged in said housing, said support body being provided with a support ring which is fastened to said housing and in which said inlet opening for said main flow is provided, said support ring being provided with radially inwardly projecting ribs on which said bearing disc is arranged axially displaced and downstream from said support ring.

11. A reversing valve according to claim 10, which includes a housing ring attached to said housing, and an annular, elastic sealing element held between said support ring and said housing ring; said sealing element being provided with an annular, elastically yieldable seat for one end face of said closure ring of said closure element; that side of said sealing element remote from said seat being acted upon by the pressure of said main flow, so that during opening of said reversing valve, said one end face of said closure ring is in engagement with said annular seat of said sealing element longer than the latter comes into engagement with said one end face during closing of said reversing valve.

12. A reversing valve according to claim 11, which includes a sealing ring and a slip ring on the radially outer periphery of said bearing disc; said sealing ring and slip ring, in the closed position of said closure element, covering said outlet openings of said channels, yet after a slight shifting of said closure element, allowing said main flow to enter said working chamber of said hydraulic adjustment member.

13. A reversing valve according to claim 11, in which said bearing disc has a radially outwardly directed surface; in which said channels are a plurality of essentially axially extending grooves formed in said outwardly directed surface; and which includes an axial valve, having an elastic, radial sealing surface, on the radially outer periphery of said working chamber of said hydraulic adjustment member, with said outlet openings of said grooves being closed in the closed position of said closure element by said axial valve.

14. A reversing valve according to claim 11, in which said support body is provided with a central, axially extending cylinder in which a piston is guided in such a way as to be movable axially back and forth; said rear wall of said closure element being connected with said piston; the upstream end of said piston being provided with a piston plate; the downstream end of said cylinder being provided with a bottom; and in which said spring element is a compression spring arranged between said piston plate and said cylinder bottom.

15. A reversing valve according to claim 14, in which said compression spring is a helical spring which surrounds said piston.

16. A reversing valve according to claim 14, in which said piston is provided with a shoulder which in the maximum open position of said closure element engages said cylinder bottom.

17. A reversing valve according to claim 11, which includes a throttle ring fastened to said housing, and a plate-like extension, which is adjustable with respect to said throttle ring, on the outer periphery of said closure ring in the region of said one end face thereof.

18. A reversing valve according to claim 17, in which said throttle ring has a cylindrical inner surface.

19. A reversing valve according to claim 17, in which said housing ring is also associated with said support ring of said support body; and which includes a plug-in unit which is axially insertable into said housing and is integral with said housing ring, with said throttle ring being formed on said plug-in unit.

20. A reversing valve according to claim 4, in which said at least one channel has a smaller flow cross section than does said closable passage.

* * * * *